United States Patent [19]
Klann

[11] Patent Number: 4,870,740
[45] Date of Patent: Oct. 3, 1989

[54] DEVICE FOR PRESSING IN AND PULLING OFF BEARINGS OR SLEEVES, IN PARTICULAR FOR AXLE BEARINGS AND/OR WHEEL FLANGE HUBS ON MOTOR VEHICLES

[76] Inventor: Horst Klann, Terra Wohnpark 12, 7730 Villingen-Schwenningen 24, Fed. Rep. of Germany

[21] Appl. No.: 238,543

[22] Filed: Aug. 30, 1988

[30] Foreign Application Priority Data

Sep. 8, 1987 [DE] Fed. Rep. of Germany ....... 3730017

[51] Int. Cl.[4] ............................................ B23P 19/04
[52] U.S. Cl. ..................................................... 29/263
[58] Field of Search ................. 29/263, 264, 265, 258, 29/280, 426.5, 802, 238

[56] References Cited

U.S. PATENT DOCUMENTS

| | | | |
|---|---|---|---|
| 3,662,451 | 5/1972 | Wagner | 29/263 |
| 3,762,021 | 10/1973 | Racin | 29/263 |
| 4,682,395 | 7/1987 | Klann | 29/263 |
| 4,709,459 | 12/1987 | Klann | 29/263 |
| 4,724,608 | 2/1988 | Parrott | 29/263 |

*Primary Examiner*—Robert C. Watson
*Attorney, Agent, or Firm*—McGlew & Tuttle

[57] ABSTRACT

A device for placing i.e., pressing in and pulling off, bearings or sleeves, in particular for axle bearings and/or wheel flange hubs of motor vehicles, includes a threaded spindle with an abutment shoulder and threaded nut, a cylindrical spacer tube with a loosely insertable front wall receiving a thrust step bearing. The device includes several axial pressure pieces which can be arranged exchangeably on the threaded spindle between the threaded nut and a workpiece. To achieve universal usability, the spacer tube is provided on one side with an end ring surface interrupted by at least one wall cutout and on the other side with a centering cone or a centering rabbet. The front wall is insertable into the spacer tube through a centering projection selectively from both end faces. In addition, the thrust step bearing is accommodated in a bearing insertion part which can be screwed into a central threaded bore of the front wall and can be replaced with the threaded spindle e.g. by a hydraulic pressing device.

10 Claims, 2 Drawing Sheets

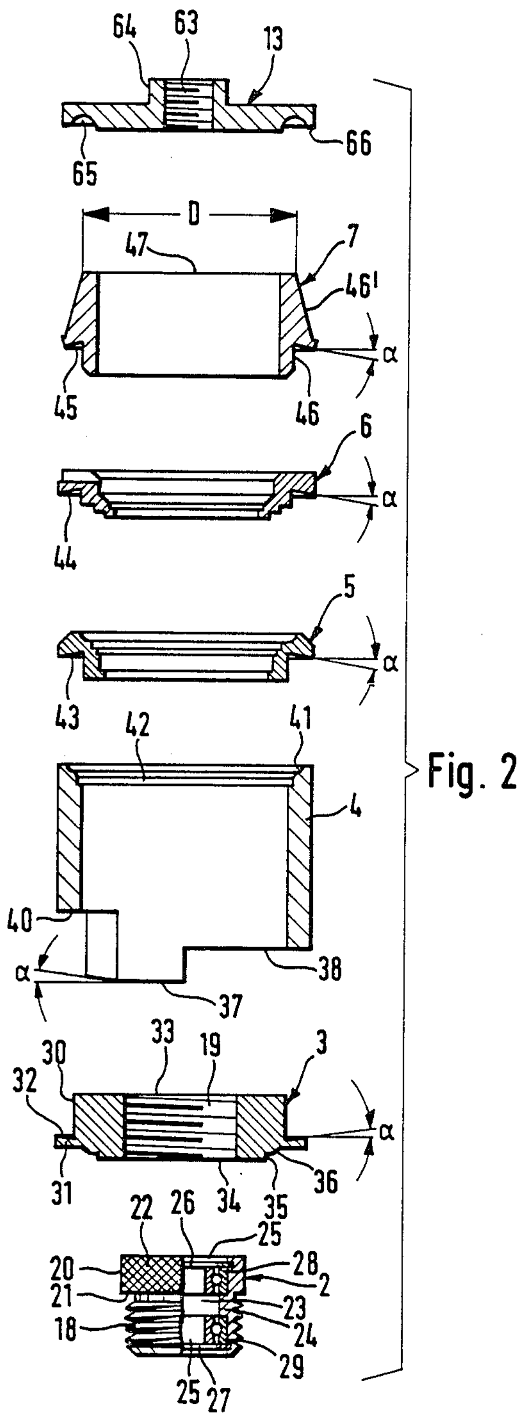
Fig. 2
Fig. 4
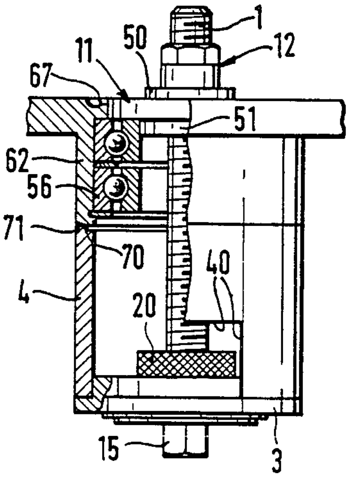
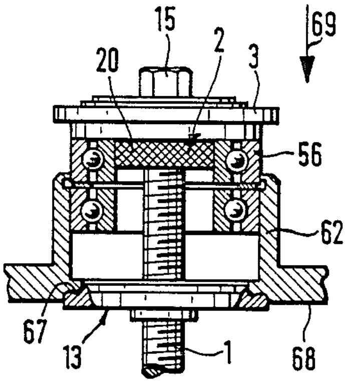
Fig. 5

DEVICE FOR PRESSING IN AND PULLING OFF BEARINGS OR SLEEVES, IN PARTICULAR FOR AXLE BEARINGS AND/OR WHEEL FLANGE HUBS ON MOTOR VEHICLES

FIELD AND BACKGROUND OF THE INVENTION

The invention relates to removal devices and in particular to a new and useful device for pressing in and pulling off bearings or sleeves, in particular axle bearings or rolling bearings and/or wheel flange hubs of motor vehicles.

The invention includes an assembly comprising a threaded spindle having an abutment shoulder and cooperating with a threaded nut. A cylindrical spacer tube has a detachable front wall in which a thrust step bearing for the abutment shoulder of a threaded spindle is arranged concentrically. The spacer tube has at least one end face for centering support at a workpiece part, e.g. a bearing housing or wheel flange hub, or, for the uptake of an exchangeable support ring to be introduced between the workpiece part and the spacer tube. Several individually exchangeable axial pressure pieces are arranged on the threaded spindle between the threaded nut and the workpiece and provided with different centering projections.

In a known device of this kind (German Pat. No. 35 30 983), spacer tube is provided at both ends with an inner thread into which can be screwed, the front wall with the thrust step bearing, provided with a threaded projection, or one of a plurality of support rings. A thrust step bearing is accommodated and secured on a front wall which has on its outer side opposite a threaded projection a tap, concentric with the bore for insertion of the threaded spindle.

The pressure pieces provided in this known device, essentially designed as cylindrical ring disks of different diameters, are provided only on one side, with a centering projection, and, on the opposite side, with a cylindrical tap for the centering uptake of a cylindrical guide part of the threaded nut, which means that they can be placed on the threaded spindle in each instance only in a specific position.

In this known device, the spacer tube, because it has at both tube extremities end faces all around, has the disadvantage that it cannot be used for bearing housings of motor vehicle axles which do not have a planar bearing surface all around but are provided with elevations. In addition, the front wall, although detachably connected or connectable with the spacer tube, can also be used only in one direction of traction.

SUMMARY OF THE INVENTION

The invention provides a device for placing and removing bearings which is made more universally usable by modifying certain parts.

According to the invention, a spacer tube has on one end face an end ring surface interrupted by at least one wall cutout and/or is provided on the other end face with a centering cone and/or centering rabbet, and that the front wall can be loosely inserted in the spacer tube and centered by a centering projection from both end faces.

With one embodiment of the invention the advantageous results that instead of a step bearing provided for the suspension of the threaded spindle there can be screwed into the front wall, for example, a hydraulic pressing device, to be able to use the device also where higher pressing forces or traction forces are required which cannot be produced with the threaded spindle.

The bearing insertion part designed according to another embodiment brings with it the additional advantage that it can be screwed into the front wall selectively from one or the other side and this front wall can be used as a support element in a selective direction of either traction or pressure, respectively.

The design of the bearing insertion part of still another embodiment offers the additional advantage that it itself can serve as a centering element for an axle bearing to be pressed in.

While the embodiment of the invention of still another embodiment serves for easier handling of the bearing insertion part when screwing into or out of the front wall, another embodiment of the invention offers the possibility of using the spacer tube in conjunction with the adapter tube also for those axle bearing housings of motor vehicles, in particular for extraction of the axle bearings, where the maximum width of the end-face support surface has a smaller diameter than the spacer tube.

Another embodiment not only is an additional centering between one end face of the spacer tube and a support part contiguous thereto achieved, but also it is ensured that the interrupted end face is not exposed to pressure forces pressing radially outward, but on the contrary to pressure forces acting inwardly which increases its resistance to breakage.

The realization of the invention according a further embodiment makes it possible to use the front wall itself as centering support element without the spacer tube.

Owing to the design of the pressure pieces according to still a further embodiment, these are usable also on both sides, so that their number required for the different applications is reduced to about one-half.

By providing a threaded nut, handling of the device is simplified in certain applications, namely where its flanged disk can be placed on center directly by a correspondingly formed end face edge surface of an axle bearing housing.

Accordingly it is an object of the invention to provide an improved device for either positioning or pulling off the bearing or sleeve of an axle or wheel flange hub of a motor vehicle and which includes a threaded spindle having a plurality of parts positionable thereon in an arrangement to engage one end of a workpiece which uses a selected axial pressure piece all held on a threaded spindle with a threadable nut.

A further object of the invention is to provide a device for removing, particularly for automobile parts which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the Drawings:

FIG. 2 is a sectional view of the various parts of the device in coaxial arrangement;

FIG. 4 is a partial sectional and elevational view of another embodiment of device used when a wheel roller bearing is pressed out of the wheel bearing housing of a motor vehicle;

FIG. 5 is a view of another embodiment of the device when a wheel bearing is being pressed into the wheel bearing housing of a motor vehicle shown also in FIG. 4.

DESCRIPTION OF THE PREFERRED EMBODIMENTS

Figures 1, 3A, 3B, 3C, 3D:
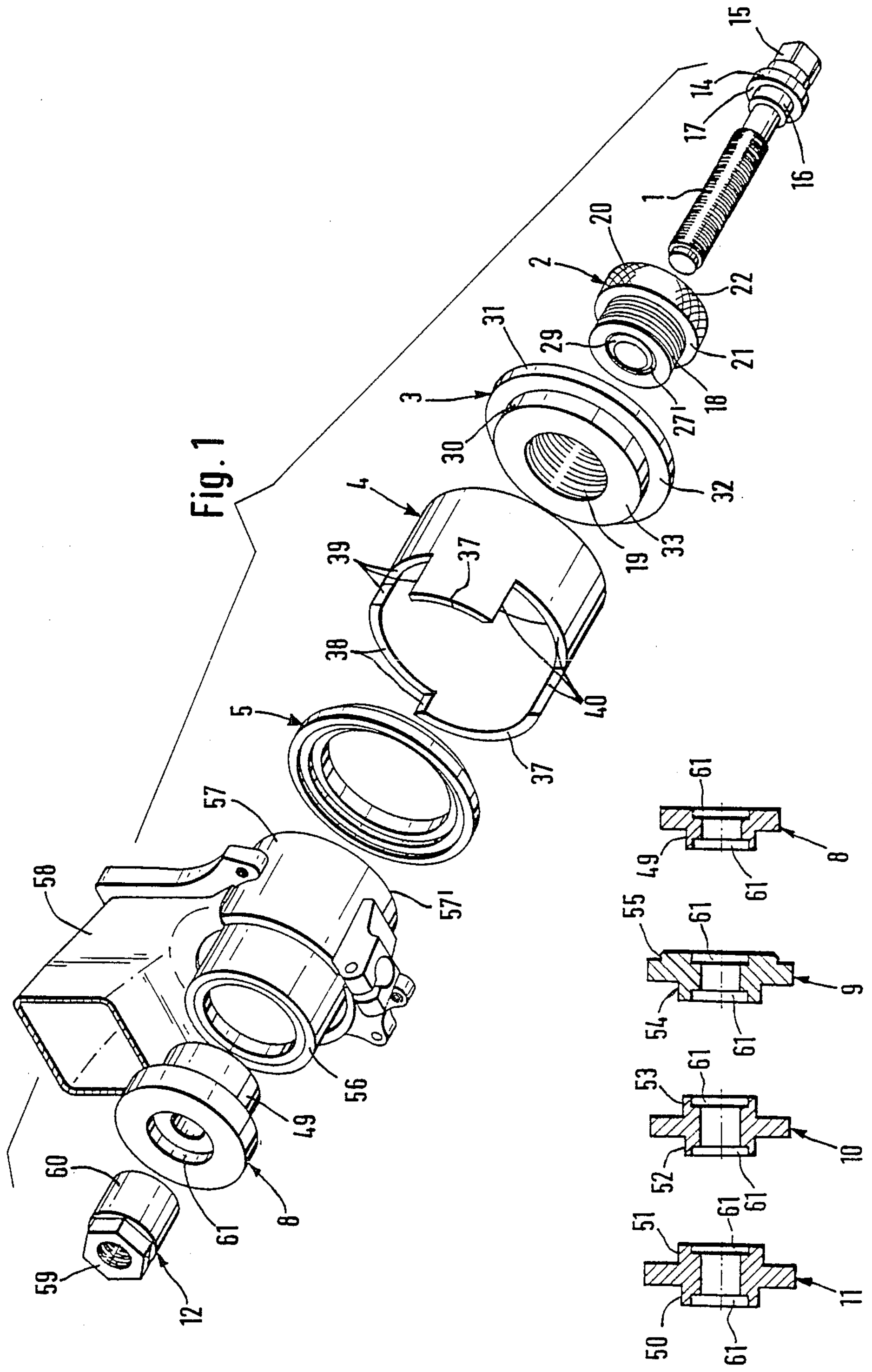
FIG. 1 shows an exploded perspective view of a placement device for a wheel bearing of a motor vehicle construction in accordance with the invention.
FIGS. 3*a*, 3*b*, 3*c* and 3*d* are sectional views of different embodiments of pressure pieces.

Referring to the drawings in particular, the invention embodied therein comprises a device for placing, that is for pressing on or in or pulling off bearings or sleeves, and in particular for axial bearings and/or wheel flange hubs of motor vehicles.

The device illustrated in the drawing comprises a threaded spindle 1, a bearing insertion part 2, a circular disk type front wall 3, a spacer tube 4, support rings 5 and 6, an adapter tube 7, several axial pressure pieces 8, 9, 10 and 11, as well as a threaded nut 12 and a flanged disk 13 replacing the latter.

At one end the threaded spindle 1 is provided with a ring flange 14 and therebehind with a wrench contour 15, which is preferably hexagonal. In addition, the threaded spindle has a cylindrical centering projection 16 which ends at an annular abutment shoulder 17 of the ring flange 14.

The bearing insertion part 2 has a threaded projection 18, whose axial length corresponds approximately to the total thickness of the front wall 3, and which can be screwed into a central threaded bore 19 of the end wall 3 selectively from both sides. Contiguous to the threaded projection 18 is a cylindrical centering head 20 of greater diameter which has, on the side toward the threaded projection, a radial abutment shoulder 21 and is provided on its generated surface with a cross knurl 22. Instead of the cross knurl 22 or in addition to it the centering head may be provided with two parallel wrench surfaces, so that in case of jamming in the threaded bore 19 it can be screwed out with the use of a wrench.

As can best be seen from FIG. 2, the bearing insertion part is provided with a bore 23 for insertion of the threaded spindle 1. On either side of an annular web 24 located approximately in the axial center, the bearing insertion part has furthermore, in each of two cylindrical cutouts 25, a thrust step bearing 28, 29 secured by means of an axial lock ring 26,27. The bearing 28 and 29 can alternately serve as contact surfaces for the ring flange 14 of the threaded spindle 1.

The threaded projection 18 and the threaded bore 19 are designed so that there can be inserted into the threaded bore 19, instead of the bearing insertion part 2, hydraulic pressure unit with which greater axial forces can be produced than is possible with the threaded spindle 1.

The front wall 3 has a cylindrical centering projection 30 adapted to the inside diameter of the spacer tube 4. Contiguous to the projection 30 is a ring flange 31 whose outside diameter is adapted to the outside diameter of the spacer tube 4. The ring surface 32 of the ring flange 31, turned toward the centering projection, is undercut at an angle alpha of about 5°. While the end face 33 of the centering projection 30 is planar, the opposite end face 34 of the front wall 3 has two short stepped centering projections 35 and 36, at which rolling bearing bushings to be pressed in for example can be centered.

The spacer tube 4, which in the practical realization has an outside diameter of about 99.5 mm and a wall thickness of about 0.7 mm, is completely cylindrical inside and outside and has a length of about 80 mm. At its one end face, its end ring surface 37, serving for support on end faces of wheel bearing housings of motor vehicles, is interrupted by three wall cutouts 38, 39 and 40 of different depth in axial direction, so that there are only two ring sectors approximately diametrically opposite each other. These cutouts 38, 39, 40 serve for the unhindered uptake of projections and elevations that exist in some vehicle types at the wheel bearing housings, at which the spacer tube 4 must be applied to pull out the wheel bearing.

These wall cutouts 38, 39 and 40 weaken the spacer tube. To compensate this weakening, the end face 37 is beveled with a cone angle alpha also of 5° analogous to the ring surface 32 of the front wall 3 so that when placing the front wall 3 on the end ring surface sections 37 in the manner illustrated in FIG. 4, the wall sections of the spacer tube 4, with the end wall sections 37, are pressed under axial load, not radially outward, but rather inward against the centering projection 30.

On the end face opposite the wall sections 38, 39 and 40, the spacer tube 4 is provided with a centering inner core 41 and contiguous thereto with a centering rabbet 42, both being adapted to correspondingly formed end faces of different axle bearing housings of motor vehicles.

Also the support rings 5 and 6, each provided with several outer and inner annular support shoulders of different diameter, as well as the adapter tube 7 have ring surfaces 43, 44, 45 serving as support shoulders like the front wall 3, each of them being undercut again at an angle of 5°. The purpose of this undercut is the same as for the ring surface 32.

Besides, the two support rings 5 and 6 serve the same purpose as in the known device, with the only difference that they do not have threaded projections but can be applied loosely on the spacer tube 4 at the end faces.

The adapter tube 7 is provided at one end with a cylindrical centering projection 46, whose outside diameter is adapted to the inside diameter of the spacer tube 4, so that it can easily be received by the latter with little radial play. The extension part 46 lying on the opposite side of the ring surface 45 has a conical form tapering toward the opposite end face 47, so that its end-face outside diameter D is smaller than the outside diameter of the spacer tube 4. This adapter tube is used as extension of the spacer tube 4 wherever an axle bearing housing has an end-face annular support surface whose greatest outside diameter is smaller than the outside diameter of the spacer tube 4 and therefore the spacer tube 4 itself cannot be centeringly applied there.

The pressure pieces 8, 9, 10 and 11, which are formed essentially as cylindrical ring disks of different diameter and are provided in each instance with one or two cylindrical centering projections 49 to 55, of different diameter, and which can be placed selectively on the threaded spindle 1., The pieces are adapted as to their form to different rolling bearings 56 in order that they can be received by the latter centeringly in the manner illustrated in FIG. 1 and 4.

It can be seen from FIG. 1 that the threaded nut 12 includes a wrench profile 59 formed as hexagon and of a cylindrical centering part 60 directly contiguous thereto. For the centering uptake of this centering part 60 of the threaded nut 12, all pressure pieces 8, 9, 10 and 11 are provided on both sides with rabbet type cylindrical taps 61.

In FIG. 1, the device is illustrated as it is used for the pressing in of a rolling bearing 56 into the bearing housing 57 of automotive axle journal 58 using the spacer tube 4 as well as a support ring 5 and the pressure piece 8. It should be imagined in this connection that the bearing insertion part 2 has been fully screwed into the threaded bore 19 of the front wall 3, that the threaded spindle 1 has been passed through the bearing insertion part 2 and protrudes through the spacer tube 4, the support ring 5, the bearing housing 57, the rolling bearing 56 and the pressure piece 8, and that the threaded nut 12 has been screwed on the end of spindle protruding from the pressure piece 8. The front wall 3 is then just as centered in the spacer tube 4 as the support ring 5 which is centered by one of its inner support shoulders on the end face 57, of the bearing housing 57. By the simultaneous centering of the pressure piece 8 in the rolling bearing 56 it is ensured that the axial forces exerted on the bearing housing 57 and on the rolling bearing 56 when the threaded spindle 1 is being tightened, with simultaneous retention of the threaded nut 12, do not permit a wedging of the rolling bearing but ensure satisfactory introduction of the rolling bearing into the bearing housing 57.

In the practical example of FIG. 5 there are used of the device according to the invention for pressing in of a rolling bearing 56 into another bearing housing 62 only the threaded spindle 1, the front wall 3 with the inserted bearing insertion part 2, and instead of the threaded nut 12 the flanged disk 13. This flanged disk 13 has a central threaded bore 63, which fits on the threaded spindle 1, and a cylindrical hub projection 64. On the end face opposite the hub projection 64, (FIG. 2) the flanged disk 8 is provided near the circumference with an annular groove 65 of approximately semicircular cross section which is surrounded by an annular rib 66 also of semicircular form. The cross sectional profiles of the annular groove 65 and of the annular rib 66 are, as illustrated in FIG. 5, matched to a corresponding counter-profile 67 on the end-face side 68 of the bearing housing 62, so that the flanged disk 13 can be applied there centeringly in the illustrated manner in order to press the rolling bearing 56 into the bearing housing 62 in the direction of arrow 69.

However, to be able to extract the same rolling bearing 56 from the housing 62, one needs of the device, as FIG. 4 shows, besides the threaded spindle 1, the front wall 3, the spacer tube 4 and the pressure piece 11 as well as the threaded nut 12. The spacer tube 4 is then placed on the annular end surface 70 of the bearing housing 62. This end surface 70 is provided with a conical bevel 71 which exactly fits into the inner cone 41 of the spacer tube 4, so that the tube centers itself on this bevel 71. It can also be seen that the centering projection 51 of the pressure piece 11 protrudes centeringly into the bore of the axle bearing or rolling bearing 56, so that as the threaded spindle 1 is being rotated in pulling direction, the forces acting on the rolling bearing 56 and on the bearing housing 62 are oriented exactly axially and do not allow any wedging.

By the three examples of use illustrated in FIG. 1, 4 and 5 it has been shown that different parts of the entire device are taken into use depending on the particular case. But by the new design of the individual parts of the device it is achieved that a minimal number of them suffices for almost all applications in the pressing in and pulling off of axle bearings.

While specific embodiments of the invention have been shown and described in detail to illustrate the application of the principles of the invention, it will be understood that the invention may be embodied otherwise without departing from such principles.

What is claimed is:

1. A device for pressing in and pulling off bearings and sleeves, in particular for axle roller bearings and wheel flange hubs of motor vehicles, comprising: a threaded spindle having an abutment shoulder, a threaded nut engaged on the threaded spindle, a cylindrical spacer tube having a detachable front wall, said front wall having a thrust step bearing engageable with said abutment shoulder of said threaded spindle and arranged concentrically thereon, said spacer tube being formed on at least one end face with a surface with the centering support of a workpiece bearing housing, selectable exchangeable axial pressure piece arranged on said threaded spindle between said threaded nut and said workpiece and provided with a distinct selectable centering projection, said spacer tube having at least one end face, at least one of an end ring surface interrupted by at least one wall cutout and a centering rabbet, said front wall being loosely inserted in said spacer tube and being centered by said centering rabbet.

2. A device according to claim 1, wherein said front wall has a central threaded bore, said step bearing for the abutment shoulder of said threaded spindle being accommodated in a bearing insertion part, said bearing insertion part being threaded into said threaded bore to which said threaded spindle can be passed up to said abutment shoulder.

3. A device according to claim 2, wherein said bearing insertion part is threadable onto said front wall and has a cylindrical cutout on its interior with an annular web portion arranged approximately in the axial center thereof, and a thrust step bearing insertable into each cutout.

4. A device according to claim 3, wherein said bearing insertion part is provided with a cylindrical centering head having a diameter greater than that of its threaded projection and being matched to the inside diameter of said axle bearing.

5. A device according to claim 4, wherein said centering head has a knurled formation thereon and having an end with a wrench engaging surface.

6. A device according to claim 5, including an adapter tube arranged contiguous to a centering projection of inside diameter of said spacer tube contiguous to a support shoulder being centered in respect to said spacer tube and having a conically tapered extension part with an end face outside diameter which is smaller than that of said spacer tube.

7. A device according to claim 1, wherein the interrupted end ring surface of said spacer tube and the ring surface to be brought into abutment on this end ring surface of said front wall of said support rings and of said adapter tube being formed with an undercut conically formed surface.

8. A device according to claim 7, wherein said front wall has an end face opposite to said centering projection with at least one integrally machined centering step ring.

9. A device according to claim 1, wherein said axial pressure pieces are provided on both sides with different centering projections and also with coaxial cylindrical taps for said threaded nut.

10. A device according to claim 1, wherein said threaded nut has a flanged disk with a threaded bore and having an annular groove near the edge thereof of approximately semicircular cross-section.

* * * * *